(12) United States Patent
Strope et al.

(10) Patent No.: US 9,263,034 B1
(45) Date of Patent: *Feb. 16, 2016

(54) ADAPTING ENHANCED ACOUSTIC MODELS

(75) Inventors: Brian Strope, Palo Alto, CA (US);
Douglas H. Beeferman, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 1040 days.

This patent is subject to a terminal disclaimer.

(21) Appl. No.: 12/834,981

(22) Filed: Jul. 13, 2010

(51) Int. Cl.
*G10L 15/00* (2013.01)
*G10L 15/16* (2006.01)
*G10L 15/065* (2013.01)
*G10L 15/07* (2013.01)

(52) U.S. Cl.
CPC .............. *G10L 15/065* (2013.01); *G10L 15/07* (2013.01)

(58) Field of Classification Search
CPC ....... G10L 15/00; G10L 15/063; G10L 15/06; G10L 15/065; G10L 15/07; G10L 15/075; G10L 15/08; G10L 15/18; G10L 15/1815; G10L 15/1822; G10L 15/183; G10L 15/26; G10L 2015/00; G10L 2015/063; G10L 2015/0631; G10L 2015/0635; G10L 2015/0636; G10L 2015/0638
USPC .......................... 704/231, 236, 239, 251, 252
See application file for complete search history.

(56) References Cited

U.S. PATENT DOCUMENTS

| 6,766,295 B1 * | 7/2004 | Murveit et al. ................ 704/243 |
| 6,879,956 B1 * | 4/2005 | Honda et al. .................. 704/244 |
| 6,912,498 B2 * | 6/2005 | Stevens et al. ................ 704/235 |
| 7,216,079 B1 * | 5/2007 | Barnard et al. ............... 704/244 |
| 7,620,549 B2 | 11/2009 | Di Cristo et al. |
| 7,660,715 B1 * | 2/2010 | Thambiratnam ............. 704/244 |
| 7,702,512 B2 * | 4/2010 | Gopinath et al. ............. 704/270 |
| 7,756,710 B2 * | 7/2010 | Franco et al. ................. 704/255 |
| 7,827,032 B2 | 11/2010 | Braho et al. |
| 7,848,926 B2 * | 12/2010 | Goto et al. .................... 704/251 |
| 7,895,039 B2 * | 2/2011 | Braho et al. .................. 704/251 |
| 7,899,671 B2 * | 3/2011 | Cooper et al. ................ 704/252 |
| 7,996,218 B2 * | 8/2011 | Kim et al. ..................... 704/236 |
| 8,019,602 B2 | 9/2011 | Yu et al. |
| 8,155,961 B2 * | 4/2012 | Tian ............................. 704/257 |
| 8,352,264 B2 * | 1/2013 | White et al. .................. 704/255 |
| 2003/0191648 A1 * | 10/2003 | Knott et al. ................... 704/275 |
| 2003/0220791 A1 * | 11/2003 | Toyama ........................ 704/256 |

(Continued)

OTHER PUBLICATIONS

Notice of Allowance for U.S. Appl. No. 13/249,332 dated Apr. 3, 2012, 18 pages.

*Primary Examiner* — Paras D Shah
(74) *Attorney, Agent, or Firm* — Fish & Richardson P.C.

(57) ABSTRACT

Methods, systems, and apparatus, including computer programs encoded on a computer storage medium, for enhancing speech recognition accuracy. In one aspect, a method includes receiving voice queries, obtaining, for one or more of the voice queries, feedback information that references an action taken by a user that submitted the voice query after reviewing a result of the voice query, generating, for the one or more voice queries, a posterior recognition confidence measure that reflects a probability that the voice query was correctly recognized, wherein the posterior recognition confidence measure is generated based at least on the feedback information for the voice query, selecting a subset of the one or more voice queries based on the posterior recognition confidence measures, and adapting an acoustic model using the subset of the voice queries.

20 Claims, 3 Drawing Sheets

(56) References Cited

U.S. PATENT DOCUMENTS

| | | | |
|---|---|---|---|
| 2003/0233237 A1* | 12/2003 | Garside et al. | 704/270 |
| 2004/0102971 A1* | 5/2004 | Lipscher et al. | 704/236 |
| 2005/0159949 A1* | 7/2005 | Yu et al. | 704/235 |
| 2005/0187768 A1* | 8/2005 | Godden | 704/238 |
| 2005/0192801 A1 | 9/2005 | Lewis et al. | |
| 2006/0178886 A1* | 8/2006 | Braho et al. | 704/246 |
| 2008/0091426 A1 | 4/2008 | Rempel et al. | |
| 2008/0147396 A1 | 6/2008 | Wang | |
| 2008/0228486 A1* | 9/2008 | Claiborn et al. | 704/257 |
| 2008/0288252 A1 | 11/2008 | Cerra et al. | |
| 2009/0030698 A1* | 1/2009 | Cerra | G10L 15/30 704/275 |
| 2009/0037175 A1 | 2/2009 | Wang et al. | |
| 2009/0100050 A1* | 4/2009 | Erol | G06F 17/30026 |
| 2009/0228273 A1* | 9/2009 | Wang et al. | 704/235 |
| 2010/0076765 A1* | 3/2010 | Zweig et al. | 704/255 |
| 2010/0228548 A1* | 9/2010 | Liu et al. | 704/251 |
| 2010/0312555 A1 | 12/2010 | Plumpe et al. | |
| 2011/0077942 A1 | 3/2011 | Ljolje et al. | |
| 2011/0184735 A1* | 7/2011 | Flaks et al. | 704/240 |
| 2011/0208507 A1* | 8/2011 | Hughes | 704/9 |

\* cited by examiner

ADAPTING ENHANCED ACOUSTIC MODELS

This specification generally relates to speech recognition.

A user of a mobile device may enter query terms by, for example, typing on a keyboard or speaking a voice query into a microphone. An Automated Search Recognition ("ASR") engine may have difficulty accurately recognizing voice queries when the sounds associated with a particular language vary with the accent of a user.

SUMMARY

In general, one innovative aspect of the subject matter described in this specification may be embodied in processes for adapting enhanced acoustic models, either by building new acoustic models or by improving existing acoustic models, using past voice queries that an ASR engine determines are likely to have been accurately transcribed. The accuracy of a transcription may be estimated based at least in part upon one or more actions that a user who submitted a voice query took after the voice query was transcribed by the ASR engine. Records that reflect the actions of multiple, actual users of the ASR engine may be used to rapidly improve initial, "bootstrap" versions of an acoustic model, thereby reducing the quantity of recognition errors realized by the engine.

As used by this specification, a "search query" (or, when spoken, a "voice query" or a "voice-based search query") includes one or more query terms that a user submits to a search engine when the user requests the search engine to execute a search, where a "term" or a "query term" includes one or more whole or partial words, characters, or strings of characters. Among other things, a "result" (or a "search result") of the search query includes a Uniform Resource Identifier (URI) that references a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

Furthermore, an "initial" version of an acoustic model may be the first version of an acoustic model, i.e., the first version of an acoustic model of a new language, or the "initial" version may be a second or subsequent version, i.e., a version of the acoustic model that precedes an enhanced version. An "engine" (or "software engine") refers to a software-implemented input/output system that provides an output that is different than the input. An engine may be an encoded block of functionality, such as a library, a platform, Software Development Kit ("SDK") or an object.

In general, another innovative aspect of the subject matter described in this specification may be embodied in methods that include the actions of receiving voice queries, obtaining, for one or more of the voice queries, feedback information that references an action taken by a user that submitted the voice query after reviewing a result of the voice query, generating, for the one or more voice queries, a posterior recognition confidence measure that reflects a probability that the voice query was correctly recognized, wherein the posterior recognition confidence measure is generated based at least on the feedback information for the voice query, selecting a subset of the one or more voice queries based on the posterior recognition confidence measures, and adapting an acoustic model using the subset of the voice queries.

In general, another innovative aspect of the subject matter described in this specification may be embodied in methods that include the actions of receiving voice queries, obtaining, for one or more of the voice queries, feedback information that references an action taken by a user that submitted the voice query after reviewing a result of the voice query, determining, for one or more of the voice queries and based on the feedback information, whether the user took a particular action after receiving the result of the voice query, selecting a subset of the one or more voice queries in which the user is determined to have taken the particular action, and adapting an acoustic model using the subset of the voice queries.

Other embodiments of these aspects include corresponding systems, apparatus, and computer programs, configured to perform the actions of the methods, encoded on computer storage devices.

These and other embodiments may each optionally include one or more of the following features. In various examples, the posterior recognition confidence measure reflects a probability that a first acoustic model correctly recognized the voice query, and adapting an acoustic model further comprises building a different, second acoustic model; building the second acoustic model further comprises building the second acoustic model using the first acoustic model and the subset of the voice queries; selecting the subset of the voice queries further comprises selecting the voice queries that have a posterior recognition confidence measure above a predefined threshold; selecting the subset of the voice queries further comprises selecting the voice queries that have a posterior recognition confidence measure above a first predefined threshold and below a second predefined threshold; the posterior recognition confidence measure is generated based at least on the feedback information for the voice query, and is further based on a speech recognizer confidence measure; the feedback information identifies whether the user selected the result of the voice query within a predetermined period of time of submitting the voice query; the feedback information identifies whether the user submitted another voice query within a predetermined period of time of submitting the voice query; the feedback information identifies whether the user revealed an alternates list; the feedback information identifies whether the user typed into a query box after receiving the result; the feedback information identifies whether the user explicitly confirmed that the voice query was correctly recognized; adapting an acoustic model further comprises adapting an acoustic model using only the subset of the voice queries; the actions further include receiving an additional voice query, and performing speech recognition on the additional voice query using the acoustic model; and/or the actions further include performing a search query using a result of the speech recognition.

Particular embodiments of the subject matter described in this specification may be implemented to realize one or more of the following advantages. Users may be clustered according to accent. Search results may be adapted based on implicit preferences that may be reflected in a user's accent, dialect, or speech pattern. Users may find relevant search results more quickly, improving the overall search experience. A user may find search results that were interesting to other people who are similar to the user and, conversely, the user may not be shown search results that were interesting to people who are dissimilar to the user.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
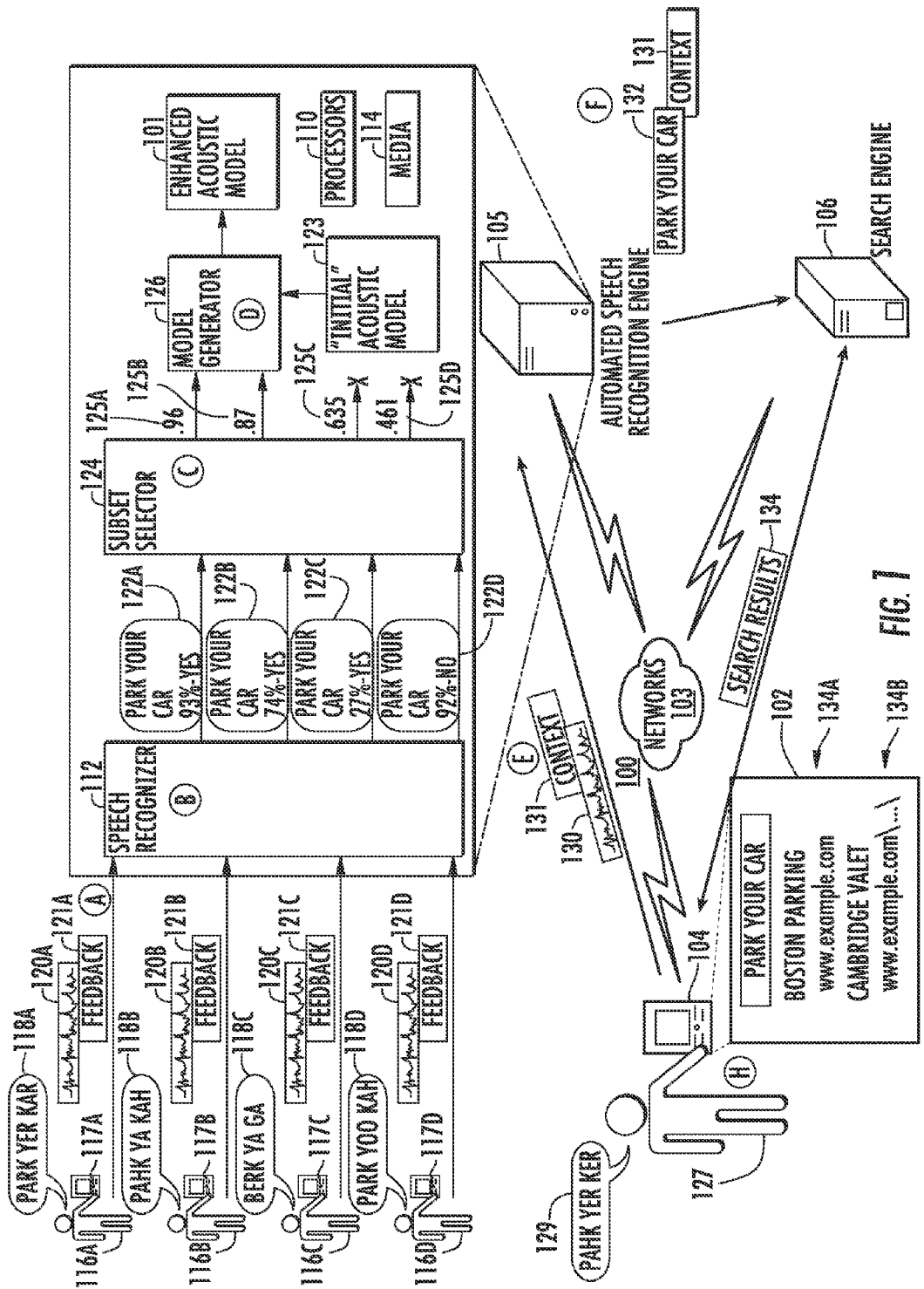
FIG. 1 is a diagram of an example system that can generate enhanced acoustic models.

FIG. 1 is a diagram of an example system 100 that can generate an enhanced acoustic model 101. FIG. 1 also illustrates a flow of data within the system 100 during states (a) to (h), as well as a search engine results page 102 that is displayed on a mobile client communication device ("mobile device") 104 during state (h). The states (a) to (h) may occur in the illustrated sequence, or they may occur in a sequence that is different than the illustrated sequence.

Briefly, for each voice query that has been submitted to a search engine since the release of an initial, bootstrap version of an acoustic model, the system 100 estimates a likelihood that the initial version of an acoustic model correctly recognized the voice query. The likelihood may be reflected in a likelihood score or measure. A subset of the voice queries and corresponding transcriptions are selected based on their associated likelihoods, for example to select voice queries whose scores indicate that they are highly likely to have been correctly recognized. The subset may include all or fewer than all of the voice queries.

A voice query may be selected as part of the subset if the likelihood exceeds or otherwise satisfies a threshold, or if the likelihood falls between two thresholds. For example, voice queries that have a likelihood of 80% or higher may be selected as part of the subset based on the inference that the transcription generated by the initial version of the acoustic model that has a likelihood score of 80% or higher is likely to have been correctly transcribed by an ASR engine.

In another example, voice queries that have a likelihood of 95% or higher may not be selected as part of the subset, based on the inference that the initial version of the acoustic model is likely to have correctly transcribed the voice query to a degree that further refinement of the initial version of the acoustic model is not necessary or would not be a prudent use of modeling and computational resources. For example, modeling and computational resources can be spared without sacrificing accuracy if the top 5% most accurately transcribed voice queries are ignored, to avoid estimating parameters at the head of a distribution where the initial acoustic model was already performing adequately. The subset of the voice queries and, optionally, other data such as the initial version of the acoustic model itself are used to build an enhanced version of the acoustic model (or, "enhanced acoustic model").

The enhanced acoustic model is used by the system 100 to recognize subsequent voice queries. Other subsets of voice queries that have been transcribed by the enhanced acoustic model may be used to train a second or subsequent enhanced version of the acoustic model, for example to further refine the acoustic model as additional voice queries are received.

In some implementations, the likelihood that the initial version of the acoustic model correctly recognized the voice query is determined based on a speech recognition confidence measure, which is the ASR engine's own estimate of the likelihood that it correctly recognized the voice query. Because the speech recognition confidence measure is not influenced by actions taken by the user, i.e., actions taken after reviewing a result of the voice query, the speech recognition confidence measure is referred to by this specification as a "non-causal" recognition confidence measure.

In other implementations, the likelihood is informed based on implicit or explicit feedback from the user, such as the user's actions after the transcription was generated. For example, the selection of a search result by a user after performing a search, or the failure of the user to perform additional searches, may be a positive indication that the ASR engine correctly recognized the voice query. Conversely, the user's act of typing a correction on the mobile device after submitting the voice query, the act of immediately retrying a recognition, or the failure of the user to select a search result, may be negative indications that the ASR engine did not correctly recognize the voice query.

The system 100 includes the mobile devices 104 and 116, which are in communication with an ASR engine server 105 and a search engine server 106 over one or more networks 103 (e.g., a wireless cellular network, a wireless local area network (WLAN) or Wi-Fi network, a Third Generation (3G) or Fourth Generation (4G) mobile telecommunications network, a private network such as an intranet, a public network such as the Internet, or any appropriate combination thereof). The mobile devices 104 and 116 may be mobile phones, tablet computers, music players, e-book readers, laptop or desktop computers, PDAs, smart phones, or other stationary or portable devices that include one or more processors and computer readable media.

The ASR engine server 105 is made up of one or more computing devices (i.e., servers that include one or more processors 110 and computer readable media 111) that, among other capabilities, convert speech to text using a speech recognizer 112. The search engine 106 is made up of one or more computing devices that, among other capabilities, search for information on the networks 103. The ASR engine server 105 and the search engine server 106 may be implemented on the same device, or on different devices.

Referring to the example illustrated in FIG. 1, during state (a), users 116A-D speak voice queries 118A-D into the microphones of mobile devices 119A-D, respectively. The users 116A-D may each be a different person, or two or more of the users 116A-D may be the same person. For example, users 116A and 116D may be the same user, speaking different voice queries 118A and 118B at different times.

In the figure, the voice queries 118A-D are phonetically transcribed as "park yer kar," "pahk ya kah," "berk yoo ga," and "park yoo kah," respectively, reflecting the real-world variations in accent, pronunciation, and speech patterns of several users who are speaking the same voice query, i.e., the correct orthographic "park your car." Regardless of accent, the ASR engine server 105 is expected to accurately transcribe the voice queries 118A-D, and to submit the transcriptions to a search engine to perform a search query.

A user may submit a voice query by, for example, pressing a button on a mobile device to initiate a search dialogue before speaking, speaking the voice query, then releasing the button on the mobile device. In another example, a user may select a user interface control (e.g., a microphone icon) on a mobile device before speaking a voice query. As yet another example, the microphone may be activated before a user speaks, or may be in an "always on" state, to allow the user to speak without manually activating the microphone. For instance, a mobile device may use a continuous recording buffer.

The mobile devices 119 encode the voice queries 118 into audio signals 120A-D (or "samples," or "waveforms") which, for example, may be two-second (or more) snippets of relatively high quality audio, such as sixteen kilohertz lossless audio. The mobile devices 119A-D communicate the audio signals 120A-D and, optionally, feedback information 121A-D over the networks 103 to the ASR engine 111. For example, the mobile devices 119A-D may each create a sound file or a data stream when recording a respective voice query, and may send the sound file or data stream over the networks 103. In some implementations, the mobile devices 119A-D may each establish a session with the ASR engine server 105, and may send the audio signals 120A-D to the ASR engine server 105 during the session.

The feedback information 121A-D that is transmitted with the audio signals 120A-D identifies one or more actions taken by the user 116A-D after reviewing a result of the voice queries 118A-D respectively. For example, the feedback information 121A may identify whether, after the user received a result of the voice query 118A "park yer kar," the user selected a result of the voice query 118A (e.g., within a predetermined period of time, such as 5 seconds or 30 seconds), submitted another voice query within a predetermined period of time of submitting the voice query 118A, revealed an alternates list, typed into a query box after receiving the result, and/or explicitly confirmed that the voice query 118A was correctly recognized by the speech recognizer 112. The feedback information 121A-D may identify, as an 'action,' that a user took no action after reviewing a result of a voice query.

In various implementations, the feedback information 121A-D may be or may include a textual description of the action taken by the user after reviewing a result encoded, for example, in an eXtensible Markup Language (XML) file. In other implementations, the feedback information 121A-D may be a bit field that includes flag bits that can be used by the ASR engine server 105 or the search engine server 106 to identify a particular action. The feedback information 121A-D may be explicitly identified by a user or, if a user opts to allow such a determination, the action may be automatically determined by the respective mobile device based on an automated analysis of the user's interactions with the mobile device.

For privacy protection, any historical, behavioral or other data gathered may be made on an opt-in basis. Gathered data can be anonymized by various approaches. For example, search history data or feedback information can be anonymized for privacy protection, so that the data, if compromised, cannot be associated with a particular user or user identifier. Various anonymization processes, such as hashing, encryption and obfuscation techniques, may be used to ensure that subject privacy is protected.

During state (b), the ASR engine server 105 receives the audio signals 120A-D and, if provided, the feedback information 121A-D. The speech recognizer 112 performs speech recognition on the audio signals 120A-D, and generates data 122A-D that includes one or more transcriptions of the audio signals 120A-D, respectively, a speech recognition confidence measure for each transcription, and feedback information associated with each transcription. The speech recognizer 112 performs speech recognition by matching the sounds of the voice queries 118A-D with candidate transcriptions that it determines the users 116A-D may have spoken, using the initial acoustic model 123.

For each candidate transcription, the corresponding speech recognition confidence measure reflects the fit or closeness of the acoustic match, as measured by the speech recognizer 112 at the time of the recognition. For instance, the speech recognition confidence measure may be a number between 0 and 1, and may give an indication of how confident the speech recognizer 112 is that the candidate transcription is the correct transcription of a corresponding audio signal. Because the speech recognition confidence measure is a non-causal recognition confidence measure, it is typically not informed by other signals that indicate the actions taken after the speech recognition is performed, such as the actions taken by users in reviewing the results of the speech recognition or the results of other follow-on processes.

The speech recognizer 112 uses one or more other models, such as noise models, language models, or popularity models (or trends data, or models of recent popularity trends), to perform the speech recognition or to help inform the speech recognition process. The feedback information output by the speech recognizer 112 may be the same as, or may be augmented by, the feedback information 121, or the feedback information output by the speech recognizer 112 may be different than or unrelated to the feedback information 121. Regardless of whether the feedback information output by the speech recognizer 112 is identical to the feedback information 121, however, each instance of feedback information references an action taken by a user after reviewing a result of a voice query.

In FIG. 1, the feedback information ("yes") output by the speech recognizer 112 for the voice query 118A may indicate that the user 116A took a particular action, or selected a result of the voice query 118A. Similarly, the feedback information ("no") output by the speech recognizer 112 for the voice query 118D may indicate that the user did not take a particular action, or did not explicitly confirm that the voice query 118D was correctly recognized. In FIG. 1, the speech recognizer 112 generates data 122A that includes a transcription ("park your car") for the voice query 118A ("park yer kar"), a speech recognition confidence measure ("93%"), and feedback information ("yes"); the speech recognizer 112 generates data 112B that includes a transcription ("park your car" for the voice query 118B ("pahk ya kah"), a speech recognition confidence measure ("74%), and feedback information ("yes"); and so on.

During state (c), a subset selector 124 of the ASR engine server 105 receives the data 122A-D output from the speech recognizer 112, and uses the data 122A-D to generate scores 125 for the transcriptions and to select a subset of the transcriptions based on the scores 125. The scores may be based on the speech recognition confidence measures alone, the feedback information alone, or by the speech recognition confidence measures and/or the feedback information in combination with other information.

In FIG. 1, the subset selector 124 generates a score for each transcription based on the corresponding speech recognition confidence measure in combination with the feedback information. Because the score is influenced by actions taken by the user after reviewing a result of the voice query and, specifically, is not simply based on speech recognizer confidence at the time when a voice query is initially transcribed, this specification refers to the score as a "posterior" recognition confidence measure.

For the voice query 118A, the subset selector 124 positively skews the speech recognition confidence measure of 93% based on the "yes" feedback information, to generate a score 125A of "0.96"; positively skews the speech recognition confidence measure of 74% for the voice query 118B based on the "yes" feedback information, to generate a score 125B of "0.87"; and positively skews the speech recognition confidence measure of 27% for the voice query 118C based on the "yes" feedback information, to generate a score 125C of "0.63". Unlike the voice queries 118A-C that included positive ("yes") feedback information, the subset selector 124 negatively skews the speech recognition confidence measure 122D of 92% for the voice query 118D based on the "no" feedback information, to generate a score 125*d* of "0.46".

Once scores are generated for the various transcriptions, the subset selector 124 selects a subset of the voice queries 118 based on the score. Selecting a subset of the voice queries may include selecting those voice queries whose score satisfies a predetermined minimum threshold, or whose score is above a predetermined minimum threshold and is below a predetermined maximum threshold. In FIG. 1, the voice queries 118A-B are selected as the subset because their scores ("0.96" and "0.87", respectively) satisfy a predetermined minimum threshold of "0.75," while the voice queries 118C-D are not selected because their scores ("0.63" and "0.46", respectively) do not satisfy the predetermined minimum threshold. Other thresholds may be used, as may other approaches for selecting voice query subsets.

In an alternate implementation, the subset generator 124 selects the subset of the voice queries without generating scores at all. For instance, the subset selector may apply rules to the feedback information and, as a result, may select as the subset the voice queries in which the user has taken one or more particular actions. One rule may, for example, specify that the voice queries in which the user has typed into a query box or search box after receiving a result should not be selected to be part of the subset. Such an approach may not make use of the speech recognition confidence measure generated by the speech recognizer 112.

Another approach selects voice queries using rules and speech recognition confidence measures. For instance, a rule may specify that voice queries in which the speech recognition confidence measure exceeds a predetermined threshold should be selected to be part of the subset, except where the user types in a correction within a predetermined period of time. Another rule may specify that voice queries whose speech recognition do not exceed the predetermined threshold, but in which an alternates list has been opened or selected, should be selected as part of the subset.

During state (d), a model generator 126 generates an enhanced acoustic model 101 using the subset of the voice queries. In one implementation, the model generator 126 generates the enhanced acoustic model 101 using only the subset of the voice queries, i.e., without using any other voice queries that were not selected as part of the subset by the subset selector 124. In another implementation, the model generator 126 generates the enhanced acoustic model 101 by updating the initial acoustic model 123 using the voice queries of the subset.

The acoustic models (whether initial 123 or enhanced 101) may be implemented as, for example, a Hidden Markov Model (HMM) or a Gaussian Mixture Model (GMM). Accordingly, the enhanced acoustic model 101 may be generated, trained or otherwise adapted using an Expectation-Maximization algorithm, or the voice queries of the subset may applied as a training set for the enhanced acoustic model 101. Further alternatively, discriminative training using the Extended Baum-Welch algorithm may be used to optimize maximum mutual information criterion. The enhanced acoustic model 101 may be generated using the voice queries of the subset as well as the voice queries (or other spoken utterances) that were used to train the initial acoustic model 123.

During state (e), at a time after the enhanced acoustic model 101 is generated, a user 127 speaks a voice query 129, intended as "park your car," but phonetically transcribed as "pahk yer ker". The user 127 may be one of the users 116 or a different user. The voice query 129 is encoded as an audio signal 130 by the mobile device 104, and is communicated from the mobile device 104 to the ASR engine server 105 over the networks 103.

The mobile device 104 may communicate other information to the ASR engine server 105 as well, such as context data 131 (e.g., a current location associated with the mobile device 104). In FIG. 1, the context data 131 may indicate that the mobile device 104 is currently located near Boston.

During state (f), the ASR engine server 105 performs speech recognition on the audio signal 130 using the enhanced acoustic model 101, to generate a candidate transcription 132 (in the figure, "park your car"). The ASR engine server 105 communicates the transcription 132 and the context data 131, if provided by the mobile device 104 or if generated by the ASR engine 105, to the search engine server 106 over the networks 103.

During state (g), the search engine server 106 generates results 134 using the transcription 132 and/or the context data 131, and transmits code that references the results 134 to the mobile device 104. During state (h), the mobile device 104 invokes the code that references the results 134 to generate the search engine results page 102, which displays the result 134A (in the figure, "Boston Parking") and the result 135B (in the figure, "Cambridge valet") to the user for selection.

Figure 2A:
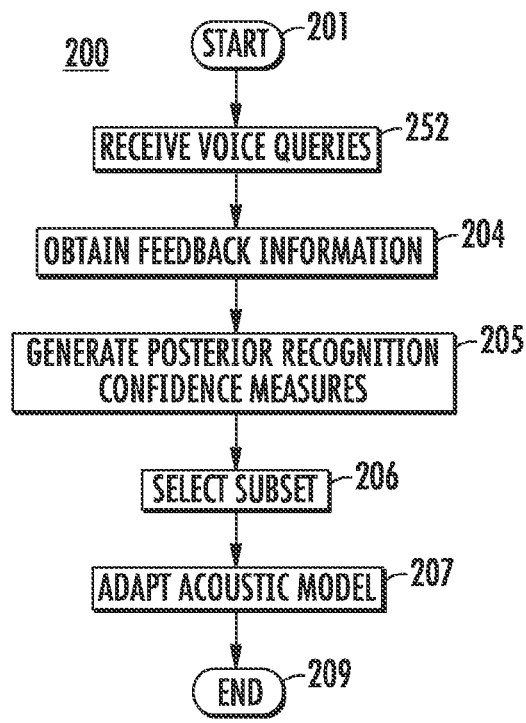
FIGS. 2A to 2C are flowcharts of example processes.

FIG. 2A is a flowchart of an example process 200. Briefly, the process 200 includes receiving voice queries, obtaining feedback information that references an action taken by a user that submitted the voice query after reviewing a result of a voice query, generating a posterior recognition confidence measure that reflects a probability that a voice query was correctly recognized, where the posterior recognition confidence measure is generated based at least on the feedback information for the voice query, selecting a subset of the voice queries based on the posterior recognition confidence measures, and adapting an acoustic model using the subset of the voice queries.

In more detail, when process 200 begins (201), voice queries are received (202) and, for one or more of the voice queries, feedback information is obtained that references an action taken by a user that submitted the voice query after reviewing a result of the voice query (204). The voice queries may be those which are received shortly after a bootstrap version of an acoustic model has been released, for example when a new language is implemented for a voice query system.

An initial, bootstrap version of an acoustic model may be generated under somewhat artificial conditions, such as by having human readers simulate voice queries by reading lists of sample or stock query terms. The utterances of these human readers may then be used as a training set of data, to train an initial acoustic model.

In speaking query terms under conditions where, for example, human readers may perceive that they are being observed or evaluated, these readers may speak in a manner which is different from the manner in which actual users of the voice query system would speak the same terms. For example, a reader may read a sample voice query somewhat formally, in a different manner than that same reader might speak that query while walking down a street. Accordingly, because the voice queries received during the process 200 may be voice queries that are received from actual users, the voice queries may more accurately reflect the nuances and informal speech patterns of a particular language than would the utterances that were used to train the initial version.

For one or more of the voice queries, a posterior recognition confidence measure is generated that reflects a probability that the voice query was correctly recognized (205). The posterior recognition confidence measure reflects a probability that that the initial acoustic model correctly recognized the voice query, and is generated based at least on the feedback information for the voice query, i.e. based on data which indicates what action the user who submitted the voice query took after the voice query was transcribed and/or after reviewing the results of the voice query.

The posterior recognition confidence measure may be generated based on information that identifies that the user selected a result of the voice query within a predetermined period of time of submitting the voice query, in which case the measure is adjusted upward, or that identifies that the user did not select a result of the voice query within the predetermined period of time, in which case the measure is adjusted downward. Such action may reflect that the user was or was not satisfied with the result and, by extension, the transcription, respectively.

The measure may be generated based on information that identifies that the user submitted another voice query within a predetermined period of time of submitting the voice query, in which case the measure is adjusted downward, or that the user did not submit another voice query within the predetermined period of time, in which case the measure is adjusted upward. Such action may reflect that the user was not or was satisfied with the transcription that the speech recognizer generated for the voice query, respectively.

The measure may be generated based on information identifies that the user revealed an alternates list on a user interface of the mobile device, i.e., a list of candidate transcriptions that the speech recognizer generated for a voice query, in which case the measure is adjusted upward, or that the user did not reveal an alternates list, in which case the measure is adjusted downward. Such action may reflect that the speech recognizer did or did not generate a transcription that was not exactly what the user intended, respectively, but which was sufficiently close for the user to believe that the intended transcription was among one of a select few alternates that the speech recognizer may have generated.

The measure may be generated based on information that identifies that the user typed into a query box after receiving the result, in which case the measure is adjusted downward, or that the user did not type into the query box after receiving the result. Such action may reflect that the user was not or was satisfied with the accuracy of the speech recognizer in general, respectively.

The measure may also be generated based on information that identifies that the user explicitly confirmed that the voice query was correctly recognized, in which case the measure is adjusted upward, or that the user explicitly confirmed that the voice query was not correctly recognized or did not explicitly confirm that the voice query was correctly recognized, in which case the measure is adjusted downward. Explicitly confirmation provides the clearest indication of whether the candidate transcription matches the voice query, since the candidate transcription is subject to human review by the user who spoke the voice query.

A subset of the voice queries is selected based on the posterior recognition confidence measures (206), to remove voice queries that can be estimated as not being transcribed correctly, i.e., queries whose posterior recognition confidence measures do not satisfy a threshold, Alternatively, the subset of the voice queries may exclude voice queries that the initial version already recognizes with very high levels of measured accuracy, i.e., queries whose posterior recognition confidence measures that exceed a threshold.

An acoustic model is adapted using the subset of the voice queries (207), e.g., the subset of the voice queries only, thereby ending the process 200 (209). Subsequent voice queries are recognized using the adapted acoustic model. The result of these recognitions may be used to perform a search query or other function.

The adapted acoustic model, which may be the same acoustic model or a different acoustic model as was used to recognize the voice queries and to generate the posterior recognition confidence measures, is adapted using an Expectation-Maximization algorithm, or the voice queries of the subset may applied as a training set for the enhanced acoustic model. Further alternatively, discriminative training using the Extended Baum-Welch algorithm may be used to optimize maximum mutual information criterion. The acoustic model may be adapted further using the acoustic model that was used to recognize the voice queries and to generate the posterior recognition confidence measures.

Figure 2B:
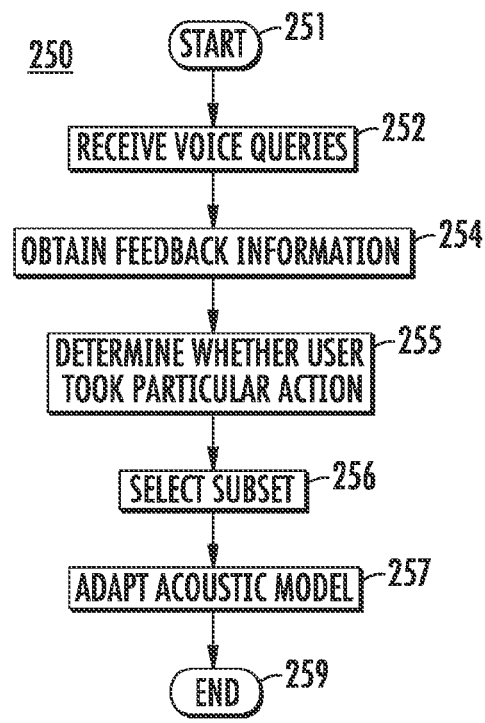

FIG. 2B is a flowchart of an example process 250. Briefly, the process 250 includes receiving voice queries, obtaining, for one or more of the voice queries, feedback information that references an action taken by a user that submitted the voice query after reviewing a result of the voice query, determining, for one or more of the voice queries and based on the feedback information, whether the user took a particular action after receiving the result of the voice query, selecting a subset of the one or more voice queries in which the user is determined to have taken the particular action, and adapting an acoustic model using the subset of the voice queries. According to the process 250, the logs of past action taken by actual users is not used to generate a probabilistic model, but rather rules are applied to received voice queries to determine whether or not a particular voice query should be selected as part of a subset.

In more detail, when the process 250 begins (251), voice queries are received (252) and, for one or more of the voice queries, feedback information is obtained that references an action taken by a user that submitted the voice query after reviewing a result of the voice query (254). The received voice queries may be voice queries that are received from actual users, which may more accurately reflect the nuances and informal speech patterns of a particular language than would the utterances that were used to train the initial version. The voice queries may be those which are received shortly after an initial version of an acoustic model has been released, for example when a new language is implemented for a voice query system.

For one or more of the voice queries, and based on the feedback information, it is determined whether the user took a particular action after receiving the result of the voice query (255). For example, it is determined whether the user selected a result of the voice query within a predetermined period of time of submitting the voice query, submitted another voice query within a predetermined period of time of submitting the voice query, revealed an alternates list, typed into a query box after receiving the result, and/or explicitly confirmed that the voice query was correctly recognized A subset of the voice queries is selected in which the user is determined to have taken the particular action (256). For example, the voice queries in which the user did not submit another voice query, or in which the user revealed an alternates list, may be selected as part of the subset. An acoustic model is adapted using the subset of the voice queries (257), thereby ending the process 250 (259).

Figure 2C:
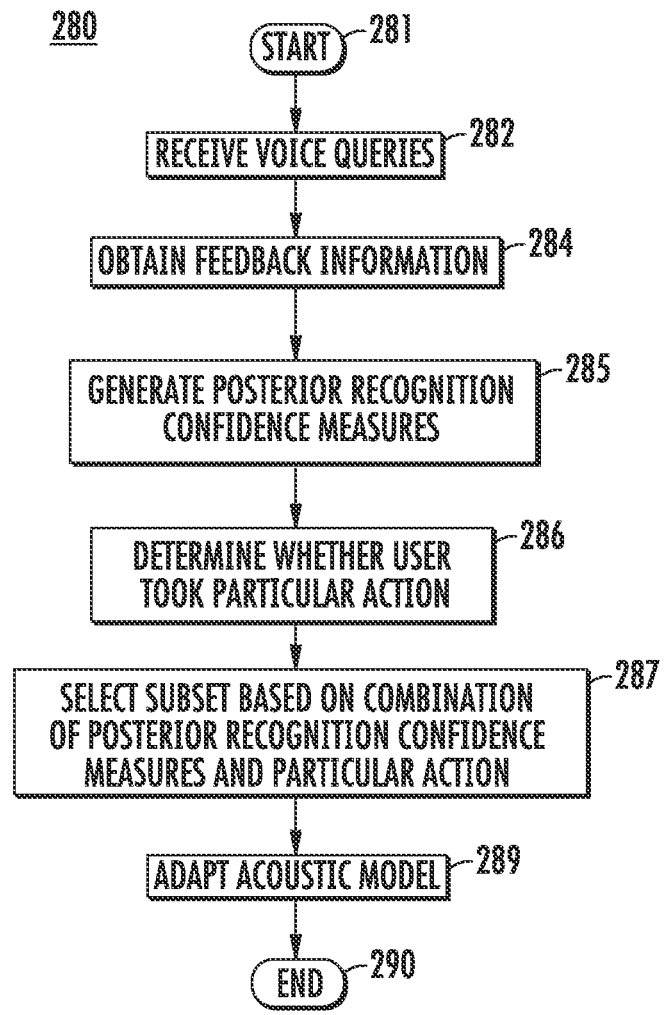

FIG. 2C is a flowchart of an example process 280. Briefly, the process 250 includes receiving voice queries, obtaining, for one or more of the voice queries, feedback information that references an action taken by a user that submitted the voice query after reviewing a result of the voice query, generating a posterior recognition confidence measure that reflects a probability that a voice query was correctly recognized, where the posterior recognition confidence measure is generated based at least on the feedback information for the voice query, determining, for one or more of the voice queries and based on the feedback information, whether the user took a particular action after receiving the result of the voice query, selecting a subset of the one or more voice queries in which the posterior recognition confidence measure satisfies a predefined threshold, and in which the user is determined to have taken the particular action, and adapting an acoustic model using the subset of the voice queries. According to the process 280, the logs of past action taken by actual users is used to generate a probabilistic model in combination with rules that are applied to received voice queries, to determine whether or not a particular voice query should be selected as part of a subset.

In more detail, when the process 280 begins (281), voice queries are received (282) and, for one or more of the voice queries, feedback information is obtained that references an action taken by a user that submitted the voice query after reviewing a result of the voice query (284). The received voice queries may be voice queries that are received from actual users, which may more accurately reflect the nuances and informal speech patterns of a particular language than would the utterances that were used to train the initial version. The voice queries may be those which are received shortly after an initial version of an acoustic model has been released, for example when a new language is implemented for a voice query system.

For one or more of the voice queries, a posterior recognition confidence measure is generated that reflects a probability that the voice query was correctly recognized (285). The posterior recognition confidence measure reflects a probability that that the initial acoustic model correctly recognized the voice query, and is generated based at least on the feedback information for the voice query, i.e. based on data which indicates what action the user who submitted the voice query took after the voice query was transcribed and/or after reviewing the results of the voice query.

For one or more of the voice queries, and based on the feedback information, it is determined whether the user took a particular action after receiving the result of the voice query (286). For example, it is determined whether the user selected a result of the voice query within a predetermined period of time of submitting the voice query, submitted another voice query within a predetermined period of time of submitting the voice query, revealed an alternates list, typed into a query box after receiving the result, and/or explicitly confirmed that the voice query was correctly recognized.

A subset of the voice queries is selected in which the posterior recognition confidence measure satisfies a predetermined threshold, and in which the user is determined to have taken the particular action (287). For instance, a rule may specify that voice queries in which the speech recognition confidence measure exceeds a predetermined threshold (e.g., 0.5, or 70%) should be selected to be part of the subset, except where the user has taken the particular action of typing in a correction within a predetermined period of time. Another rule may specify that voice queries whose speech recognition do not exceed the predetermined threshold, but in which a user has taken the particular action of opening or selecting an alternates list, should be selected as part of the subset. An acoustic model is adapted using the subset of the voice queries (289), thereby ending the process 280 (290).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode data for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
   receiving voice queries submitted by at least a first user and a second user that is different from the first user;
   for each of the voice queries submitted by at least the first user and the second user, generating a score indicative of a probability that a transcription of the voice query is correct, wherein the score is generated based at least on feedback information that indicates an action, other than an explicit selection of the transcription of the voice query, taken by a respective user that submitted the voice query after reviewing the transcription of the voice query,
      wherein, for at least a particular voice query of the voice queries, the score is generated based on feedback indicating that the user that submitted the particular voice query has selected a search result provided by a search engine, wherein the search engine provided the search result in response to receiving the transcription of the particular voice query as input to the search engine;
   selecting a subset of the voice queries whose scores satisfy a threshold; and
   adapting an acoustic model using the subset of the voice queries.

2. The method of claim 1, comprising processing a third voice query submitted by a different, third user using the adapted acoustic model.

3. The method of claim 1, wherein the acoustic model is not adapted using the voice queries whose scores do not satisfy the threshold.

4. The method of claim 1, wherein the feedback information indicates that the user that submitted the voice query did not select the transcription of the voice query within a predetermined period of time after reviewing the transcription.

5. The method of claim 1, wherein the feedback information indicates whether the user that submitted the voice query submitted another voice query within a predetermined period of time after reviewing the transcription.

6. The method of claim 1, wherein the feedback information indicates whether the user that submitted the voice query revealed a list of alternate transcriptions of the voice query, after reviewing the transcription.

7. The method of claim 1, wherein the score is further based on a confidence measure generated by an automated speech recognizer for the transcription of the voice query.

8. The method of claim 1, wherein the receiving the voice queries comprises receiving voice queries input through respective user devices; and
   wherein the feedback information for a transcription indicates non-verbal user input that was provided, to the respective user device through which the voice query was received, after the user that submitted the voice query reviewed the transcription of the voice query.

9. The method of claim 1, wherein generating a score for each of the voice queries comprises generating scores based on multiple different types of user actions indicated by feedback information, each of the multiple different types of user actions being taken by a respective user that submitted the voice query after the user reviewed the transcriptions of the voice query.

10. The method of claim 9, wherein generating the scores based on the multiple different types of user actions comprises making different adjustments to the scores based on the type of user action performed by the user that submitted the voice query.

11. The method of claim 1, wherein generating a score for each of the voice queries comprises generating, for at least one of the voice queries, a score based on user feedback that indicates a user action that implicitly indicates that the transcription is correct.

12. The method of claim 1, wherein generating a score for each of the voice queries comprises:
determining, for at least one of the voice queries, a score indicative of a probability that a transcription of the voice query is correct, wherein the score is generated based on user feedback indicating that, after submitting the voice query, the user that submitted the voice query did not submit a voice query for at least a predetermined period of time.

13. The method of claim 1, wherein the search result references a resource that the search engine determines to be responsive to the transcription of the voice query received by the search engine.

14. The method of claim 1, wherein the search result includes a Universal Resource Identifier (URI) that refers to a web page.

15. A non-transitory computer-readable medium storing software comprising instructions executable by one or more computers which, upon such execution, cause the one or more computers to perform operations comprising:
receiving voice queries submitted by at least a first user and a second user that is different from the first user;
for each of the voice queries submitted by at least the first user and the second user, generating a score indicative of a probability that a transcription of the voice query is correct, wherein the score is generated based at least on feedback information that indicates an action, other than an explicit selection of the transcription of the voice query, taken by a respective user that submitted the voice query after reviewing the transcription of the voice query,
wherein, for at least a particular voice query of the voice queries, the score is generated based on feedback indicating that the user that submitted the particular voice query has selected a search result provided by a search engine, wherein the search engine provided the search result in response to receiving the transcription of the particular voice query as input to the search engine;
selecting a subset of the voice queries whose scores satisfy a threshold; and
adapting an acoustic model using the subset of the voice queries.

16. The medium of claim 15, wherein the operations comprise processing a third voice query submitted by a different, third user using the adapted acoustic model.

17. The medium of claim 15, wherein the acoustic model is not adapted using the voice queries whose scores do not satisfy the threshold.

18. A system comprising:
one or more computers and one or more storage devices storing instructions that are operable, when executed by the one or more computers, to cause the one or more computers to perform operations comprising:
receiving voice queries submitted by at least a first user and a second user that is different from the first user;
for each of the voice queries submitted by at least the first user and the second user, generating a score indicative of a probability that a transcription of the voice query is correct, wherein the score is generated based at least on feedback information that indicates an action, other than an explicit selection of the transcription of the voice query, taken by a respective user that submitted the voice query after reviewing the transcription of the voice query,
wherein, for at least a particular voice query of the voice queries,
the score is generated based on feedback indicating that the user that submitted the particular voice query has selected a search result provided by a search engine, wherein the search engine provided the search result in response to receiving the transcription of the particular voice query as input to the search engine;
selecting a subset of the voice queries whose scores satisfy a threshold; and
adapting an acoustic model using the subset of the voice queries.

19. The system of claim 18, wherein the operations comprise using the adapted acoustic model to process a third voice query submitted by a different, third user.

20. The system of claim 18, wherein the acoustic model is not adapted using the voice queries whose scores do not satisfy the threshold.

* * * * *